United States Patent [19]
Raymond, Jr.

[11] 3,828,438
[45] Aug. 13, 1974

[54] SURVEYING TAPE TENSIONING AND LEVELING APPARATUS

[76] Inventor: John G. Raymond, Jr., P.O. Box 725, Strasburg, Va. 91320

[22] Filed: Sept. 8, 1972

[21] Appl. No.: 287,245

[52] U.S. Cl............................................. 33/137 R
[51] Int. Cl. .......................................... G01b 3/00
[58] Field of Search .......................... 33/137 R, 138

[56] References Cited
UNITED STATES PATENTS

| | | | |
|---|---|---|---|
| 1,199,471 | 9/1916 | Lemassena | 33/137 R |
| 2,000,659 | 5/1935 | Carbonara | 33/137 R |
| 3,432,930 | 3/1969 | Ljungberg | 33/137 R |
| 3,435,529 | 4/1969 | Quenot | 33/138 |
| 3,630,104 | 12/1971 | Milner | 33/137 R |

Primary Examiner—Louis R. Prince
Assistant Examiner—Steven L. Stephan
Attorney, Agent, or Firm—Laurence, Laurence & Neilan

[57] ABSTRACT

Apparatus for releasably gripping a section of a surveying tape to tension the tape including a gauge for measuring the tension applied to the tape and a leveling gauge to facilitate properly positioning the tape. The apparatus is intended for in-the-field use by a surveyor's assistant and is provided with a handle so that the appropriate tension may be applied to the tape.

5 Claims, 5 Drawing Figures

PATENTED AUG 13 1974  3,828,438
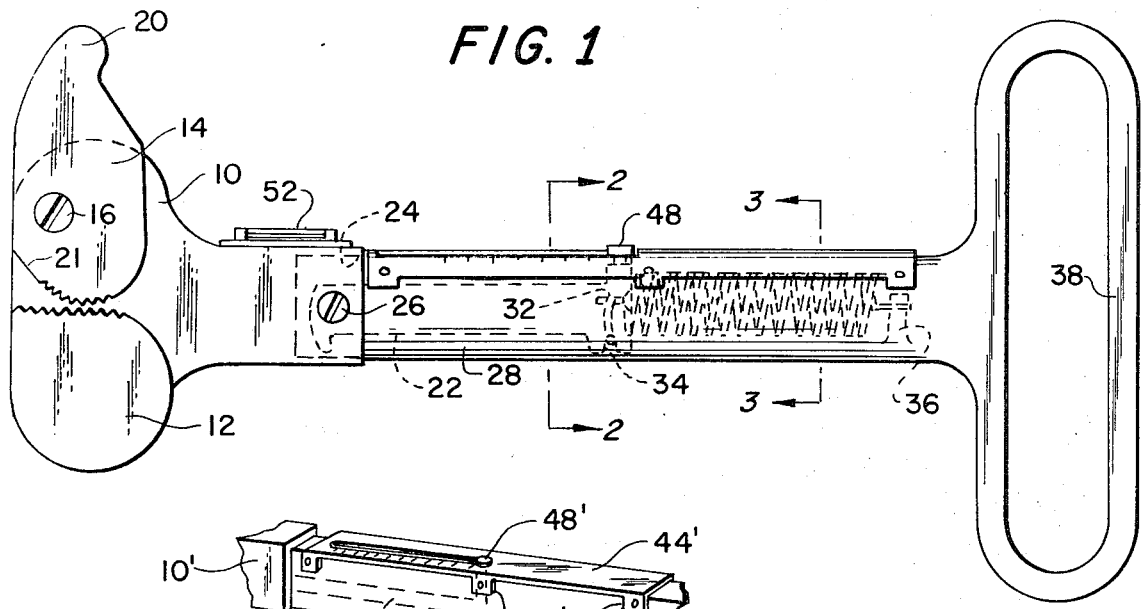
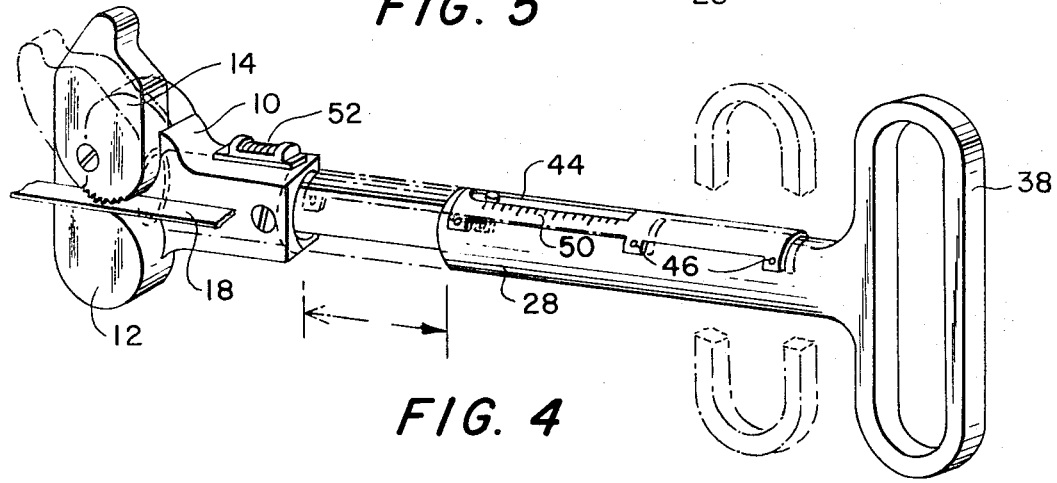
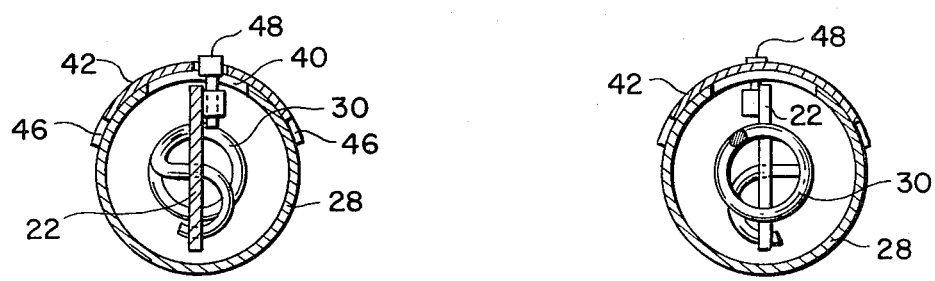

SURVEYING TAPE TENSIONING AND LEVELING APPARATUS

BACKGROUND OF THE INVENTION

The present invention relates to tensioning and leveling apparatus for use with surveying tapes and the like.

It is known that the accuracy of measuring tapes even those made of metal can be influenced by several factors, including the amount of tension on the tape at the time a measurement is made. Thus, in surveying work it is customary for the tapeman to endeavor to put the same amount of tension on the tape every time a measurement is taken. This tension is estimated at in an effort to approximately coincide with a standardizing tension which is customarily 15 pounds.

One prior art approach to this problem has utilized a relatively large stand-type of apparatus in which the tape is drawn across the level top of the stand and pulled down to tension it. However, such apparatus is awkward to use and is not satisfactory for normal use. Thus, in practice the tapeman customarily still relies upon his judgment in applying tension to the tape.

SUMMARY OF THE INVENTION

It is a primary object of the present invention to provide readily portable apparatus which may be utilized to tension surveying tape and the like which is compact and can be easily used in the field.

A further object of the invention is to provide a novel tape tensioning apparatus which can be readily attached to and detached from the tape.

Still another object of the invention is to provide a tape tensioning apparatus which has provision for leveling the tape to improve the accuracy of measurements utilizing the tape.

The above and other objects, features and advantages of the invention will become more apparent as this description proceeds.

Briefly, a presently preferred embodiment of the invention includes an end section having gripping elements for clamping engagement with a section of the tape, a body section retractable with regard to said end section and being normally spring biased toward said end section, a handle for grasping the apparatus to apply tension to the tape held by the gripping elements, and a scale showing the amount of tension applied to the tape. The scale is comprised of cooperating indicating means one connected to the end section and another connected to the body section. Indicia on the scale is correlated with the amount of retraction of the body section relative to the end section to show the tension on the tape. A spirit level or other similar level indicating device is also attached to the apparatus. Thus, the tapeman can adjust the position of the tape until it is level in addition to applying a desired predetermined tension to the tape prior to taking a measurement. The apparatus is compact and designed so that it may be held in one hand, and it can be readily attached to and detached from the tape.

BRIEF DESCRIPTION OF THE DRAWINGS

FIG. 1 is an elevational view of one embodiment of the present invention.

FIG. 2 is a vertical cross-sectional view taken along the line 2—2 of FIG. 1.

FIG. 3 is a vertical cross-sectional view taken along the line 3—3 of FIG. 1.

FIG. 4 is a perspective view of the embodiment of FIG. 1 with the body section being shown in a fully retracted position in the solid line illustration and with portions of the apparatus shown in dash lines indicating the normal inoperative position of the apparatus.

FIG. 5 is a partial perspective view of another embodiment of the present invention showing a modified construction for the body portion of the apparatus.

DETAILED DESCRIPTION OF THE INVENTION

Referring now to the drawings and more particularly to FIG. 1, reference numeral 10 generally designates the tape clamping head section of the apparatus. A metal surveyor's tape or the like which is to be utilized in surveying or other activity in which a high degree of accuracy is required is intended to be inserted into the bite between a lower stationary gripping element 12 and an upper movable gripping element 14. The gripping elements preferably have serrated operating surfaces which may be, for example, rubber inserts to prevent slippage and avoid marring of the tape. The upper gripping element 14 is pivotally connected to the end section 10 by a fastening member 16 such as a bolt.

Referring to FIG. 4, to facilitate attachment of the apparatus to a section of a measuring tape 18, the upper gripping element 14 is swung counterclockwise about the pivot of fastening member 16, for example, by pressing against the rear of the rounded upper projection 20 with one's thumb. The tape 18 may readily be inserted into the bite between the upper surface of the lower gripping element 12 and the relatively flat cut-off surface 21 of the upper gripping element which at this point is directly above the gripping element 12. Thereafter, the upper gripping element 14 is rotated clockwise to the solid line position in order to clamp the tape 18 in place.

A connecting bar 22 has one end disposed in an axial bore 24 in the clamping head section 10 and held in position by a threaded pivot member 26 which extends from one side to the other of the section 10 through the bore 24. Normally the remainder of the connecting bar 22 is disposed within a central body member 28 which in the FIG. 1 embodiment has a generally cylindrical hollow configuration. A tension spring 30 also disposed within the hollow body member 28 is attached to the connecting bar 22 by having an end of the spring pass through a slot 32 at the rear of the connecting bar and engage in a slot 34 at the bottom of the bar. The other end of the spring 30 is anchored to an abutment 36 adjacent to a handle 38.

As best seen in FIGS. 2 and 3, there is an elongated slot-like opening 40 in the top of the body section 28 which extends most of the length of the body section. An arcuate cover 42 is disposed over the slot 40 and closes off the slot 40 with the exception of the area under a smaller slot 44 in the section of the cover adjacent clamping head section 10. The cover 42 has six depending lugs 46 through which screws extend to attach the cover to body member 28.

An indicating element is secured to the top of the connecting bar 22 so that the top of the indicating element which is in the form of a rounded marker 48 projects upwardly through the slots 40 and 44. There are indicia 50 along a side of the slot 44 in the cover which cooperate with the marker 48 to constitute a scale which measures the tension applied to the tape 18 as will now be described.

The marker 48 is positioned so that when the tensioning apparatus is inoperative, the marker will be in the position shown in FIG. 1, at the right-hand end of the slot 44 corresponding to a zero tension position on the scale. After the measuring tape 18 is grasped by gripping members 12 and 14 adjacent to where a reading will be taken on the tape; the operator tension the tape by pulling upon handle 38. This causes the handle and body portion 28 to move towards the right as seen in FIGS. 1 and 2 against the bias of spring 30. Since the connecting bar 22 is attached to the head 10 by the threaded member 26; the retraction of the body portion 28 and hence movement of the cover 42 causes relative movement between indicia alongside slot 44 and the marker 48. The scale is calibrated so that the position of the marker along the indicia 50 represents the tension or pull in pounds applied to the tape 18. Thus, by noting the position of the marker 48, the operator may adjust the amount of pull applied to the tape until the predetermined desired tension is applied to the tape to obtain more accurate measurements.

A level indicating device such as a spirit level 52 is attached to the top of the head section 10 to further improve the accuracy of measurements by enabling the operator to determine if the tape is truly horizontal. Obviously, if the level 52 does not show that the tape is properly positioned, the entire apparatus including tape 18 would be either elevated or lowered as the case may be until the marker in level 52 is centered indicating that the measuring tape 18 is horizontal.

FIG. 5 represents another embodiment of the present invention which is substantially similar to the embodiment described previously with the exception that the body member has a different configuration. In view of this similarity between the embodiments, parts in the FIG. 5 embodiment are represented by the same reference numerals utilized in describing the first embodiment but with the addition of primes after the numerals. As seen in FIG. 5, the outer configuration of the body portion 28' is the form of a rectangular bar. The body portion of this embodiment may be machined from a metal bar such as an aluminum bar to provide a slot or bore extending from one end and open at the top for the reception of the connecting bar 22' and the associated tension spring (not shown). A marker 48' connected to the connecting bar 22' extends through the slot in the cover member 44' which in this embodiment is substantially flat with depending lugs 46' for attachment to the body portion. The structure and operation of this embodiment are otherwise the same as described in connection with the FIG. 1 embodiment.

While presently preferred embodiments have been shown and described with particularity, it will be appreciated that various changes and modifications may suggest themselves to those of ordinary skill in the art on being apprised of the present invention. It is intended to encompass all such changes and modifications as fall within the scope and spirit of the appended claims.

What is claimed is:

1. Apparatus for applying a controlled amount of tension to an article, comprising a clamping head member having gripping means to engage an article to be tensioned, said gripping means including a stationary member and a pivotably mounted gripping member pivotable about an axis parallel to the plane of the article to be tensioned and cooperating to form a bite for reception of the article, said gripping member being pivotal into operative position by means of a manually operated lever arm, a connecting member having one end attached to said clamping head section, a body member provided with a recess, said connecting member being normally disposed primarily within said recess in said body portion and slidable therein biasing means normally biasing said body member towards said clamping head section and including a tension spring provided in said recess, handle means attached to said body member, scale means correlated to the amount of extension of said body member to indicate the amount of tension applied to the article and a gauge connected to one of said members to indicate the level of the article being tensioned.

2. Apparatus according to claim 1, wherein said pivotably mounted gripping member is disposed above said stationary member in the normal operating position of the apparatus, and wherein said lever arm of said pivotably mounted gripping member has a rounded upper projection to facilitate operation by the hand of the user.

3. Apparatus according to claim 2, wherein said stationary member and said pivotably mounted gripping member each have cooperating friction increasing surfaces.

4. Apparatus according to claim 3, wherein said friction increasing surfaces are serrated surfaces.

5. Apparatus according to claim 1, whereinn said body member has a generally rectangular outer configuration, and wherein s slot is provided through a wall of said body member, said scale means including a marker connected to said connecting member and projecting through said slot, and indicia to indicate the position of said marker upon movement of said marker within said slot.

* * * * *